Figure 3:
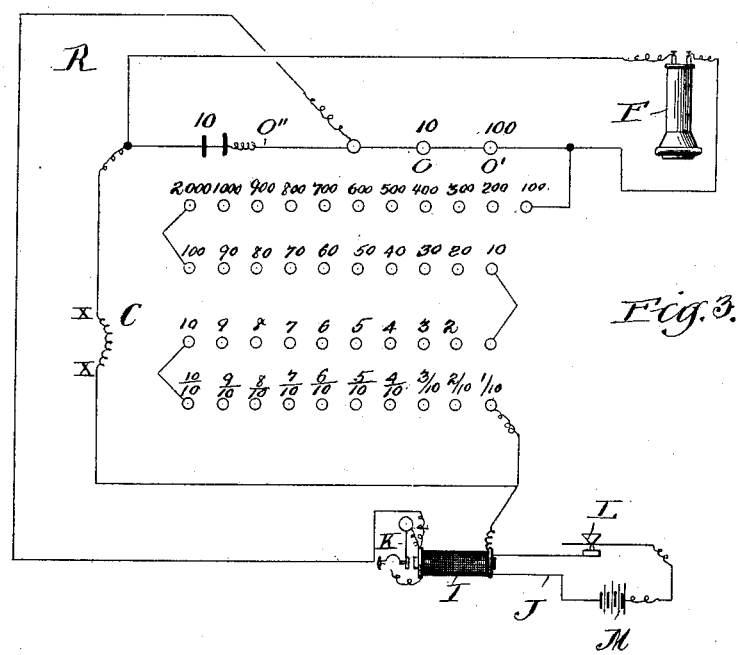

No. 645,910. Patented Mar. 20, 1900.
F. H. BROWN.
PROCESS OF LOCATING METALLIC MINERALS OR BURIED TREASURES.
(Application filed July 17, 1899.)
(No Model.) 2 Sheets—Sheet 1.
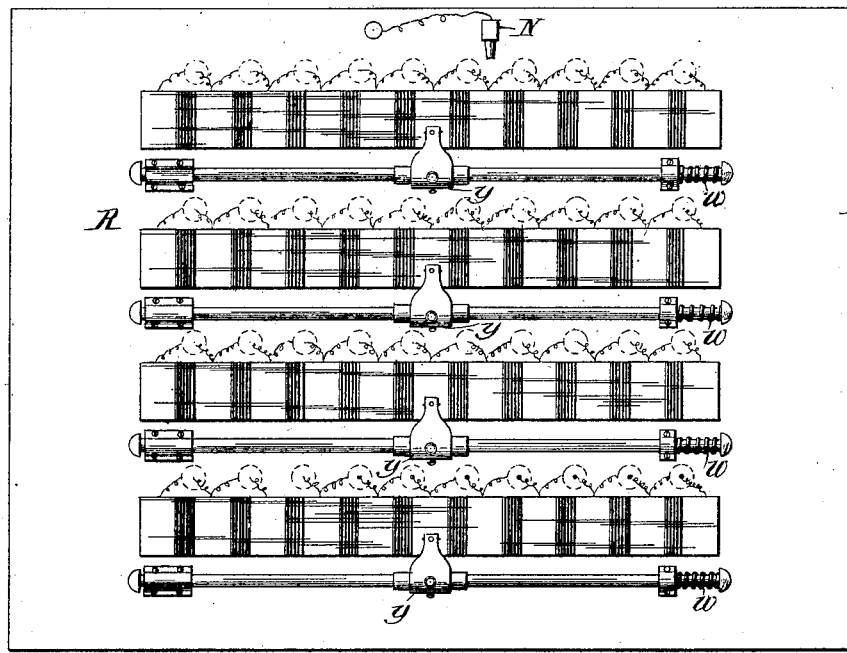
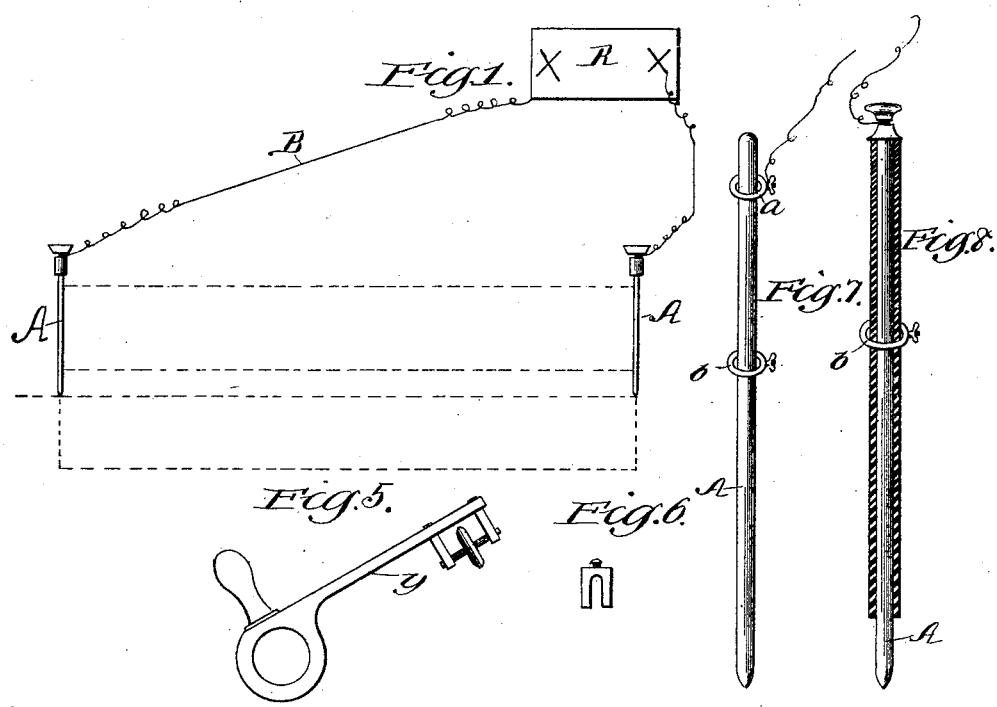
Witnesses: Inventor
Fred H. Brown
By Brown & Darby Attys No. 645,910. Patented Mar. 20, 1900.
F. H. BROWN.
PROCESS OF LOCATING METALLIC MINERALS OR BURIED TREASURES.
(Application filed July 17, 1899.)
(No Model.) 2 Sheets—Sheet 2.

Witnesses:
J. B. Weir
Ira D. Perry

Inventor
Fred H. Brown
By Brown & Darby
Attys.

UNITED STATES PATENT OFFICE.

FRED H. BROWN, OF CHICAGO, ILLINOIS.

PROCESS OF LOCATING METALLIC MINERALS OR BURIED TREASURES.

SPECIFICATION forming part of Letters Patent No. 645,910, dated March 20, 1900.

Application filed July 17, 1899. Serial No. 724,183. (No specimens.)

*To all whom it may concern:*

Be it known that I, FRED H. BROWN, a citizen of the United States, residing at Chicago, in the county of Cook and State of Illinois, have invented a new and useful Process for Locating Metallic Minerals or Buried Treasures, of which the following is a specification.

This invention relates to a process for locating metallic minerals and buried treasures.

The object of the invention is to provide a process and mode of procedure whereby the presence of ores, minerals, or buried treasure may be detected and the location thereof in the earth accurately and quickly determined.

The invention consists, substantially, in the mode of operation and procedure, as will be more fully hereinafter set forth, as shown in the accompanying drawings, and finally pointed out in the appended claims.

In carrying my invention into practical operation I measure the resistance of the earth as a conductor between terminals spaced a definite and known distance apart and contacting with the earth. I then measure the resistance of the earth as a conductor between the terminals spaced the same distance apart, but at some other point in the vicinity being tested. These measurements of resistances are repeated at various points in the vicinity and they are then compared with each other. If the resistance so measured at one point varies from that at another point to a material degree, then the presence in the earth of an ore or mineral at the point where the variation occurs is indicated. If the resistance measured at this point is much less than the average resistance measured in the same vicinity, then it is known the ore, mineral, or the like possesses the quality of being a better conductor of electricity.

By the system of measurements and comparisons of the resistance of the same fixed, definite, or known distance, as above indicated, the presence of the ore, mineral, or the like is indicated and its locality determined. Now the next step is to determine the depth of the ore, mineral, or the like beneath the surface of the earth. This result I accomplish by varying the distance or space between the terminals. For instance, if ore is located fifty feet below the surface of the earth then its presence will not be indicated if the measurements of resistance are taken through a distance of one hundred or less feet of the earth, for the reason that the current following the well-known law of seeking the path of least resistance will pass directly from one terminal to the other and without being affected by the ore, mineral, or the like. If, however, the distance of separation of the terminals be increased to two hundred or more feet, then the ore, mineral, or the like if of conducting material will offer a path of less resistance to the current as compared with the resistance offered thereto by the same distance of the earth without ore or minerals, and hence by thus varying the distance through which the measurements are taken and comparing such measurements the depth of the ore beneath the surface of the earth may be accurately determined.

The difficulty heretofore experienced in effecting the objects and purposes contemplated by my invention has been that the effect of earth-currents has not been eliminated. As is well known, earth-currents vary greatly, and even in the same vicinity. They also vary in intensity according as the measurement is taken on a line running north and south or on a line running east and west, and therefore the presence of earth-currents enters as an unknown quantity in the measurements, and hence renders such measurements wholly inaccurate and unreliable. This is particularly true where it is sought to employ continuous or battery currents, which are greatly influenced by the earth-currents, which are also continuous. Moreover, in the use of continuous or earth currents electrolysis is quickly set up at the terminals, which are inserted in the ground, thereby rendering measurements exceedingly difficult, as well as greatly multiplying the inaccuracy and unreliability of the measurements. In carrying out my invention I avoid this objection by effecting the measurements with an alternating current and which is not affected by the earth-current. In this manner I eliminate the influence of the earth-currents as a disturbing factor, and hence am enabled to secure exceedingly accurate and reliable results.

It is obvious that the process and mode of operation above set forth may be carried out in a wide variety of forms and arrangements of specific apparatus, and I desire it to be understood that my invention is not to be limited to the form or arrangement of apparatus employed.

In the accompanying drawings I have shown a form of apparatus which I have found efficient in carrying out the principles of my invention.

Figure 4:
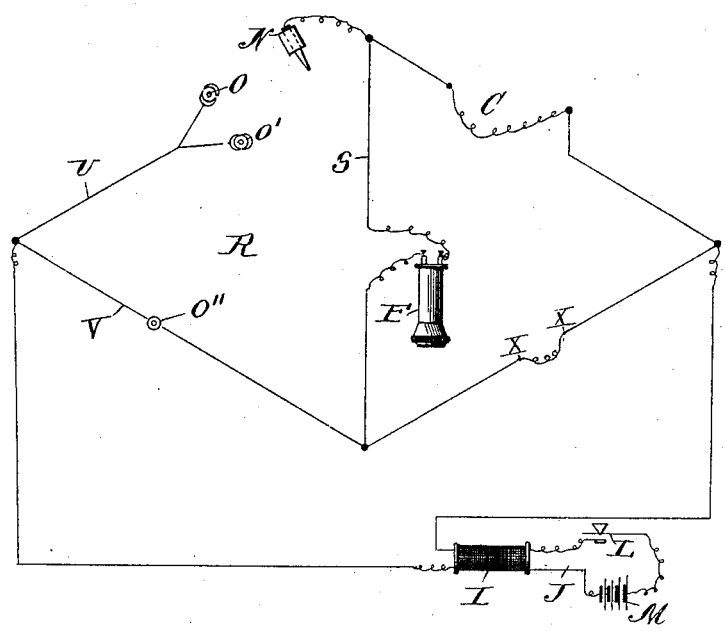

Referring to the drawings, Figure 1 is a view in diagram of an apparatus adapted for use in carrying out my invention. Fig. 2 is a top view of a form of rheostat employed in connection with the carrying out of my invention. Fig. 3 is a diagram of the circuits of the apparatus. Fig. 4 is a similar view. Fig. 5 is a detached detail view of a form of movable contact employed. Fig. 6 is a similar view of a bracket employed in connection with the movable contact. Fig. 7 is a similar view of a terminal adapted for use in carrying out the invention. Fig. 8 is a similar view of a modified form of terminal.

In the drawings reference-signs A A designate metallic rods of suitable conducting material, such as copper, adapted to be inserted in the earth. These rods form terminals of a circuit B and are connected, as at X X, in circuit with a Wheatstone bridge (indicated diagrammatically at R, Fig. 1) and the secondary of an induction-coil I. The primary J of said induction-coil includes a battery or other generator (indicated at M) and a suitable circuit-breaker, such as a key L or vibrator K. (See Fig. 3.) A rheostat or resistance-box (indicated diagrammatically at C, Fig. 4) is included in one branch of the bridge. The branch U of the bridge may include suitable multiple sockets O O' and plug N in the usual manner, and the branch V may include the fixed resistance $O^{11}$, and the branch S may include a suitable signal or indicating device, such as a telephone-receiver F.

In accordance with the well-known principles of the Wheatstone bridge when the resistance between the two terminals A A equals the resistance C, which is in circuit, and the resistance in branch U equals that in branch V then no current traverses the bridge portion S, and hence no sound or other signal will be produced therein. If, however, the relative resistance of the rheostat and of the circuit between the terminals A A is varied—as, for instance, when the resistance of that portion of the circuit between the terminals is decreased by reason of the presence of metallic ores or substances—then the electrical equilibrium of the bridge is disturbed and a signal will be given in the branch S of the bridge, and by removing or inserting, as the case may be, additional resistance in the rheostat until equilibrium is again established then the extent of such variation may be measured and determined.

In Fig. 5 is shown a form of movable contact $y$ employed in connection with the rheostat, by means of which the readings and measurements of resistance may be effected readily and rapidly. The contacts $y$ may be held toward constant contact with the rheostat in any suitable manner, as by means of a spring W. The circuit-wires may be connected to the terminals A A in any suitable manner, as by means of collars $a$, forming binding-posts, and, if desired, collars $b$ may be employed for regulating the depth to which the rods are inserted in the earth.

It may be desirable to concentrate the contact of the rods with the earth. Therefore the rods A A may be inclosed to a point adjacent to the ends thereof in an insulating sleeve or sheathing, as shown in Fig. 8, leaving only the end of such rod exposed, thus concentrating, so to speak, the conductivity of the rod at a single point.

The mode of procedure will be readily understood from the foregoing description and is as follows: The terminals A A are inserted in the earth a certain definite and known distance apart, and a reading of the rheostat is made showing the resistance of the earth or the portion thereof which is included between the terminals. This operation is repeated again and again at various points in the same vicinity, employing the same distance between the terminals and a reading of the resistance being noted in each case. Now if ores or minerals are present in the vicinity being tested then by reason of such presence the resistance of the earth at the particular point where the measurement is taken will be less than it would be if no ore or mineral were present, for the reason that the current would take the path of least resistance, and hence by comparing the measurements taken, as above described, the location as well as the presence of the ore may be detected and determined. Then by varying the distance between the terminals and comparing the corresponding readings the depth of the ore below the surface of the earth will be determined.

It will be observed that the terminals are included in the circuit of the secondary of an induction-coil, and hence I not only eliminate the factor of the earth-currents as a disturbing influence, but I also avoid the objections and defects due to electrolysis and which would destroy the accuracy and reliability of the measurements with continuous or battery currents.

I do not claim the apparatus shown and described, as the subject-matter thereof is embraced in my copending application, Serial No. 2,562, filed January 24, 1900.

Having now set forth the object and nature of my invention and the manner of carrying the same into practical operation, what I claim as new and useful and of my own invention, and desire to secure by Letters Patent, is—

1. The process of locating metallic or other conducting substances in the earth, which consists in establishing a circuit of alternating current through a definite distance of the earth, then measuring the resistance to such current, then establishing a circuit of similar current through the same distance of the earth at various other points in the same vicinity and measuring the resistance to such current at each point, and finally comparing such measurements, as and for the purpose set forth.

2. The process of locating metallic or other conducting substances in the earth which consists in establishing a circuit of alternating current through a definite distance of the earth, then measuring the resistance to such current, then establishing a circuit of similar current through the same distance of the earth at various other points in the same vicinity and measuring the resistance to such current at each point, then varying the distances through which such measurements are made and finally comparing such measurements, as and for the purpose set forth.

FRED H. BROWN.

Witnesses:
FRANK T. BROWN,
GRACE FERN.